(12) United States Patent
Weng et al.

(10) Patent No.: US 8,943,394 B2
(45) Date of Patent: Jan. 27, 2015

(54) SYSTEM AND METHOD FOR INTERACTING WITH LIVE AGENTS IN AN AUTOMATED CALL CENTER

(75) Inventors: Fuliang Weng, Mountain View, CA (US); Baoshi Yan, Mountain View, CA (US); Zhongnan Shen, Shanghai (CN); Zhe Feng, Shanghai (CN); Kui Xu, Shanghai (CN); Katrina Li, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 1423 days.

(21) Appl. No.: 12/274,258

(22) Filed: Nov. 19, 2008

(65) Prior Publication Data
US 2010/0124325 A1 May 20, 2010

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G10L 15/00 | (2013.01) |
| G10L 15/04 | (2013.01) |
| G10L 21/00 | (2013.01) |
| H04M 3/51 | (2006.01) |
| G10L 15/22 | (2006.01) |

(52) U.S. Cl.
CPC ............. *H04M 3/5166* (2013.01); *G10L 15/22* (2013.01); *H04M 2201/40* (2013.01)
USPC .................. 715/200; 704/270.1; 704/251

(58) Field of Classification Search
CPC . H04M 3/42221; H04M 3/51; H04M 3/5133; H04M 3/5183; H04M 3/5322; H04M 3/493; H04M 3/4936; G10L 15/22; G10L 2015/221
USPC ............................. 715/200; 704/270.1, 251
See application file for complete search history.

(56) References Cited

U.S. PATENT DOCUMENTS

| | | | | | |
|---|---|---|---|---|---|
| 5,649,060 | A | * | 7/1997 | Ellozy et al. ................. | 704/278 |
| 5,685,000 | A | * | 11/1997 | Cox, Jr. ............................ | 704/9 |
| 5,970,455 | A | * | 10/1999 | Wilcox et al. ................. | 704/270 |
| 6,282,511 | B1 | * | 8/2001 | Mayer .......................... | 704/270 |
| 6,336,093 | B2 | * | 1/2002 | Fasciano ....................... | 704/278 |
| 6,434,525 | B1 | * | 8/2002 | Nagisa et al. ................. | 704/260 |
| 7,310,517 | B2 | * | 12/2007 | Wolff et al. ................... | 455/416 |
| 7,593,522 | B2 | * | 9/2009 | Parker-Stephen ........ | 379/265.01 |
| 8,239,197 | B2 | * | 8/2012 | Webb et al. ................... | 704/235 |
| 2002/0077833 | A1 | * | 6/2002 | Arons et al. ................. | 704/277 |
| 2003/0046080 | A1 | * | 3/2003 | Hejna, Jr. ...................... | 704/270 |
| 2003/0083885 | A1 | * | 5/2003 | Frimpong-Ansah .......... | 704/277 |

(Continued)

*Primary Examiner* — Eric Yen
(74) *Attorney, Agent, or Firm* — Dergosits & Noah LLP (57) ABSTRACT

Embodiments of an interface system that enables a call center agent to access and intervene in an interaction between an automated call center system and a caller whenever necessary for complex application tasks is described. The system includes a user interface that presents the agent with one or more categories of information, including the conversation flow, obtained semantic information, the recognized utterances, and access to the utterance waveforms. This information is cross-linked and attached with a confidence level for better access and navigation within the dialog system for the generation of appropriate responses to the caller.

20 Claims, 4 Drawing Sheets

(56) References Cited

U.S. PATENT DOCUMENTS

| | | | |
|---|---|---|---|
| 2003/0144841 A1* | 7/2003 | Shao | 704/251 |
| 2003/0187655 A1* | 10/2003 | Dunsmuir | 704/270 |
| 2003/0187656 A1* | 10/2003 | Goose et al. | 704/270.1 |
| 2004/0249634 A1* | 12/2004 | Degani et al. | 704/207 |
| 2004/0249636 A1* | 12/2004 | Applebaum et al. | 704/231 |
| 2005/0105712 A1* | 5/2005 | Williams et al. | 379/265.02 |
| 2005/0144015 A1* | 6/2005 | Agapi et al. | 704/278 |
| 2005/0283475 A1* | 12/2005 | Beranek et al. | 707/6 |
| 2006/0095267 A1* | 5/2006 | Yano et al. | 704/275 |
| 2006/0116876 A1* | 6/2006 | Marcus | 704/231 |
| 2006/0153356 A1* | 7/2006 | Sisselman et al. | 379/265.12 |
| 2006/0233347 A1* | 10/2006 | Tong et al. | 379/265.06 |
| 2007/0041545 A1* | 2/2007 | Gainsboro | 379/188 |
| 2007/0115920 A1* | 5/2007 | Ramakrishna | 370/352 |
| 2007/0198272 A1* | 8/2007 | Horioka et al. | 704/275 |
| 2007/0203708 A1* | 8/2007 | Polcyn et al. | 704/270.1 |
| 2007/0239456 A1* | 10/2007 | Goodman et al. | 704/270 |
| 2008/0046386 A1* | 2/2008 | Pieraccinii et al. | 705/402 |
| 2008/0086690 A1* | 4/2008 | Verma et al. | 715/736 |
| 2008/0118051 A1* | 5/2008 | Odinak et al. | 379/265.09 |
| 2008/0235021 A1* | 9/2008 | Cross et al. | 704/257 |
| 2009/0067586 A1* | 3/2009 | Fano et al. | 379/49 |
| 2009/0210228 A1* | 8/2009 | George | 704/251 |
| 2009/0234648 A1* | 9/2009 | Nagatomo | 704/235 |
| 2009/0275005 A1* | 11/2009 | Haley | 434/169 |

\* cited by examiner

SYSTEM AND METHOD FOR INTERACTING WITH LIVE AGENTS IN AN AUTOMATED CALL CENTER

FIELD

Embodiments of the invention relate generally to information technology systems, and more specifically to processing information in automated call centers.

BACKGROUND

The huge increase in telecommunication-based commerce has led to the development of call centers to handle telephone calls. A call center is a centralized office where customer and other telephone calls are handled by an organization, usually with some amount of computer automation. Typically, a call center has the ability to handle a considerable volume of calls at the same time, to screen calls and forward them to appropriate personnel, and to log calls. Call centers are used by a wide variety of organizations, such as mail-order catalog companies, telemarketers, computer product help desks, and any large organization that uses the telephone to sell or service products and services. Businesses can even service internal functions through call centers, such as help desks, retail financial support, and sales support.

A call center is often operated through an extensive open workspace for call center agents, with work stations that include computers and phones for each agent. The call center can be independently operated or networked with additional centers, often linked to a corporate computer network. The voice and data pathways into the call center can be linked through a set of technologies called computer telephony integration (CTI).

Many call center systems have incorporated technologies such as speech recognition and speech synthesis to allow the call center computers to handle a first level of customer support, text mining, and natural language processing to allow better customer handling, agent training by automatic mining of best practices from past interactions, and many other technologies to improve agent productivity and customer satisfaction. Call centers can handle both inbound calls that are calls made by the consumer to obtain information, report a malfunction, or ask for help; and outbound calls where agents place calls to potential customers mostly with intentions of selling or service to the individual, such as in telemarketing applications. Call center staff are often organized into a multitier support system for a more efficient handling of calls. The first tier in such a model consists of operators, who direct inquiries to the appropriate department and provide general directory information. If a caller requires more assistance, the call is forwarded to the second tier, where most issues can be resolved. In some cases, there may be three or more tiers of support staff. If a caller requires more assistance, the caller is forwarded to the third tier of support; typically the third tier of support is formed by product engineers/developers or highly skilled technical support staff of the product.

Typically, in an automated call center, a caller is transferred to an agent only when the caller can no longer deal with the automated process and is very frustrated. In this case, the caller who is redirected to the human agent is already angry due to the unsuccessful experience with the automated system, and this anger can easily be transferred to the live agent. This adds to the difficulty that the agent has to deal with during the conversation, which may mean that it will not only take longer but also require more patience on the agent's side to complete the task. For example, the agent may need to listen to complaints about the system and suggestions for improvement, which all take time. Moreover, the agent must often retrace the steps that the caller already went through with the automated process. This only adds more time to the process and increases the frustration of the user.

Certain research systems using data collection under the Wizard-of-Oz framework have been developed in the field of call center implementation. The Wizard-of-Oz (WoZ) approach is a method of collecting high-quality user utterances in the absence of an executable application. In this approach, a hidden human agent simulates the behavior of the dialog system such that the callers believe they are interacting with a dialog system. When using a WoZ technique to study a prototype, a human "wizard" carries out functions that would be handled by a computer in an actual deployed application. This allows a design to be evaluated without fully building the system. The technique is often used in recognition-based interfaces. Best practices in developing natural language dialog system suggest that thousands of utterances need to be collected and transcribed in order to achieve a decent coverage for speech recognition and spoken language understanding. In general, the Wizard-of-Oz approach does not scale well in terms of cost and time needed to complete the data collection, and has also been criticized for its lack of realism. Certain automated data collection systems have been developed that play an open prompt to users, gets one user utterance, then plays another prompt saying the system did not understand, gets yet another user utterance, and then transfers the call to a real human operator. This system achieves data collection at the cost of negative user experience, as the users have to repeat their requests. In addition, this system cannot be used in collecting follow-up dialogs, as they can only be used at the beginning of the conversation.

Some newly proposed Wizard-of-Oz approach data collection systems for call-routing applications have attempted to solve some of the problems associated with the above approach. For example, a customer representative works on a WoZ interface to produce machine-generated voice responses to the callers, giving users an impression of human-machine interaction, while routing the calls correctly, thus achieving real-world data collection without compromising user experiences. Such a system, however, does not allow meaningful intervention of the agent in the event of a recognition problem, nor does it provide information to the agent regarding the dialog flow.

What is needed, therefore, is a system that enables agents to access and intervene in the interaction between the automated system and the caller so as to reduce the caller's frustration. What is further needed is a system that informs the agent of the content of an automated call session so that necessary repetition by the user of the automated session is minimized.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of an interface system that enables a call center agent to access and intervene in an interaction between an automated call center system and a caller whenever necessary for complex application tasks is described. The system includes a user interface that presents the agent with one or more categories of information, including the conversation flow, obtained semantic information, the recognized utterances, and access to the utterance waveforms. This information is cross-linked and attached with a confidence level for better access and navigation within the dialog system for the generation of appropriate responses to the caller.

In the following description, numerous specific details are introduced to provide a thorough understanding of, and enabling description for, embodiments of the dialog system response generation system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

In an automated call center environment, a caller interacts with an automated agent that generates responses based on the spoken user input. Proper operation of such as system requires accurate recognition of the user input (utterances), the storage of appropriate responses in a database, and the timely fetching of these responses during a dialog session. Because of the importance of proper speech recognition in such systems and the practical limitations of present automated dialog systems, problems are frequently encountered in most, if not all, commercially deployed automated call centers. Present systems must thus employ live agents or personnel to provide back up in the event of problems during an automated dialog session. Since a caller is usually transferred to a live agent only after a dialog problem is encountered, the caller is often frustrated. Embodiments of an agent interface system enable agents to access and intervene in the interaction between the automated system and the caller in an automated call center environment so as to reduce the callers' frustration and increase agent productivity. Embodiments include mechanisms to alert the agent at an early time before a problem escalates to the point where the caller may get angry, present to the agent a relevant set of information, and allow the agent to change the status of the system.

Figure 1:
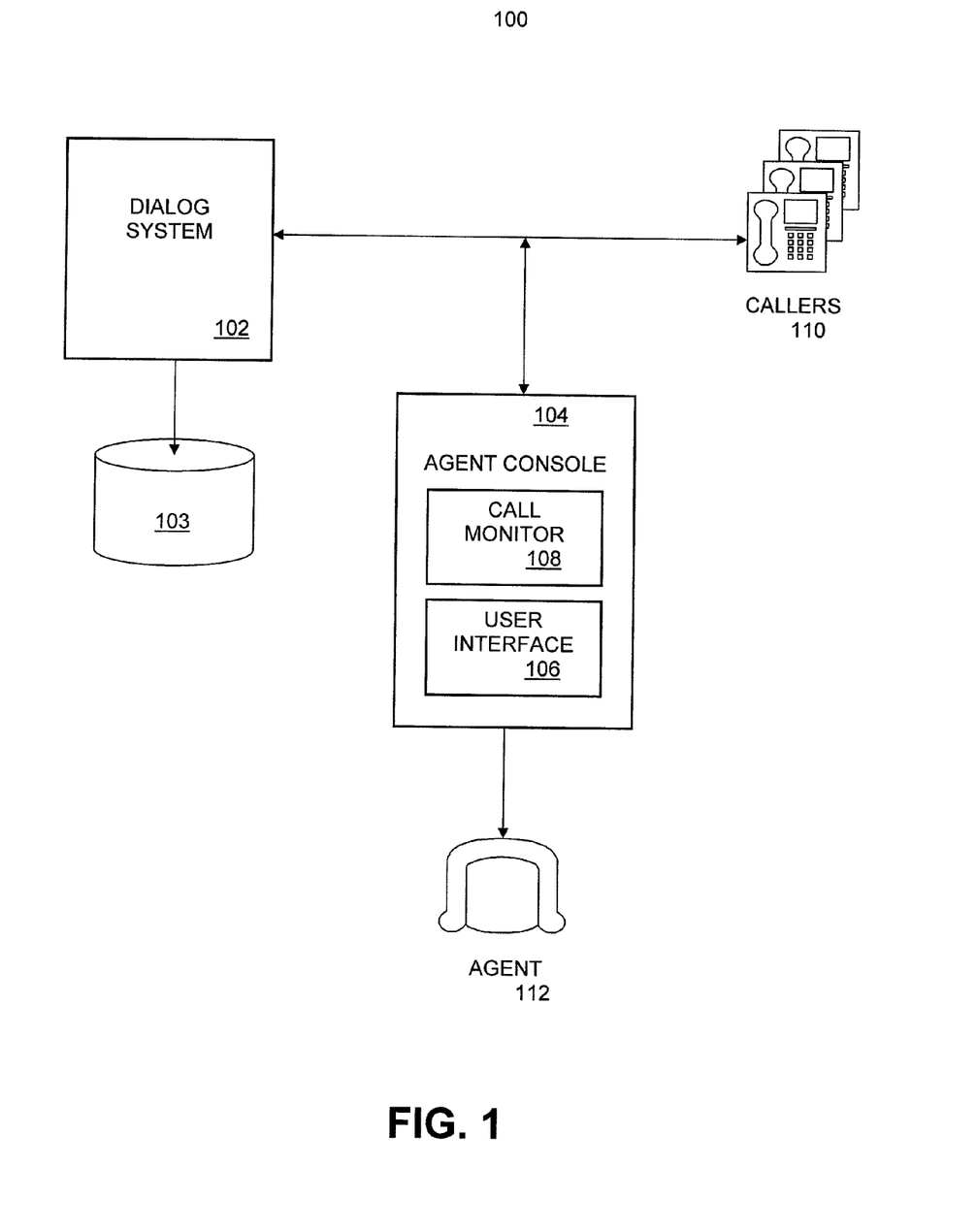
FIG. 1 is a block diagram of a call center system that includes an automated agent interface, according to an embodiment.

FIG. 1 is a block diagram of a call center system that includes an automated agent interface, according to an embodiment. Call center system 100 includes a dialog system 102 that processes calls from one or more callers 110 that call in using standard land-line or cellular-based telephone calls. The dialog system includes an automated agent process that generates responses to the caller input during a dialog sequence that may comprise a number of dialog turns. Data for the dialog system may be provided by a database 103, which may be closely coupled to the dialog system or remotely coupled over a separate network.

A standard automated call center system typically operates in two modes, an automated mode and a human agent mode. In the automated mode, the automated system interacts with a caller and tries to resolves the problems the caller reports. If the automated system resolves the problems, the call is satisfactorily terminated. If, however, the system cannot resolve the problem, the system enters the human agent mode, typically initiated by the caller himself through a voice or control button command, such as by saying "agent" or pressing "0" on the telephone handset. In the human agent mode, the live agent interacts with the caller and tries to solve the problem. At this point, the problem is either resolved, or it is passed on to a manager or other personnel for further interaction.

For the embodiment of FIG. 1, the automated call system 100 includes an agent console process 104 that interfaces a live agent 112 to the dialog system 102. The agent console process 104 constantly monitors the interaction between the caller 110 and the automated dialog system 102 through a call monitoring process 108, and presents status information regarding the call to the agent 112 through a user interface 106. The agent console 104 monitors the call to detect errors in the interaction between the automated system and the caller, presents any necessary information to the agent, and enables the agent to intervene when necessary.

In an embodiment, the call monitor process 108 maintains a set of slots for each specific domain, along with possible values for the slots. The automated dialog system 102 will flag certain slots in case there is a potential problem by indicating a suspicion about a value or values associated with the slot. In this case, the agent can listen to the utterance and try to provide a correction. The call monitor process 108 maintains the current status of the dialog, which is the state of the slots, as well as the preceding status of the dialog. The call monitor process 108 also maintains and provides additional information regarding the state of the dialog, including possible future states of the system as well as present and past states.

In one embodiment, the agent console process 104 presents three sets of information to the live agent 112. The first set of information is the dialog flow, which is the current state of the dialog as well as past history of dialog turns. The second set of information consists of the active slots associated with the current state and the values of the states, which comprise any obtained semantic information for the active slots. The third set of information is the recognized user utterances by the dialog system, and the system response, which gives the interaction between the caller and the system. For each user utterance recognized by the dialog system, a link to the waveform of the recognized utterance is provided. This allows the agent to play the actual waveform of the original audio file corresponding to the user utterance. The audio file may be stored as a ".wav" (waveform audio format) file or identical file, with a hypertext link that is provided through user interface 106.

Figure 2:
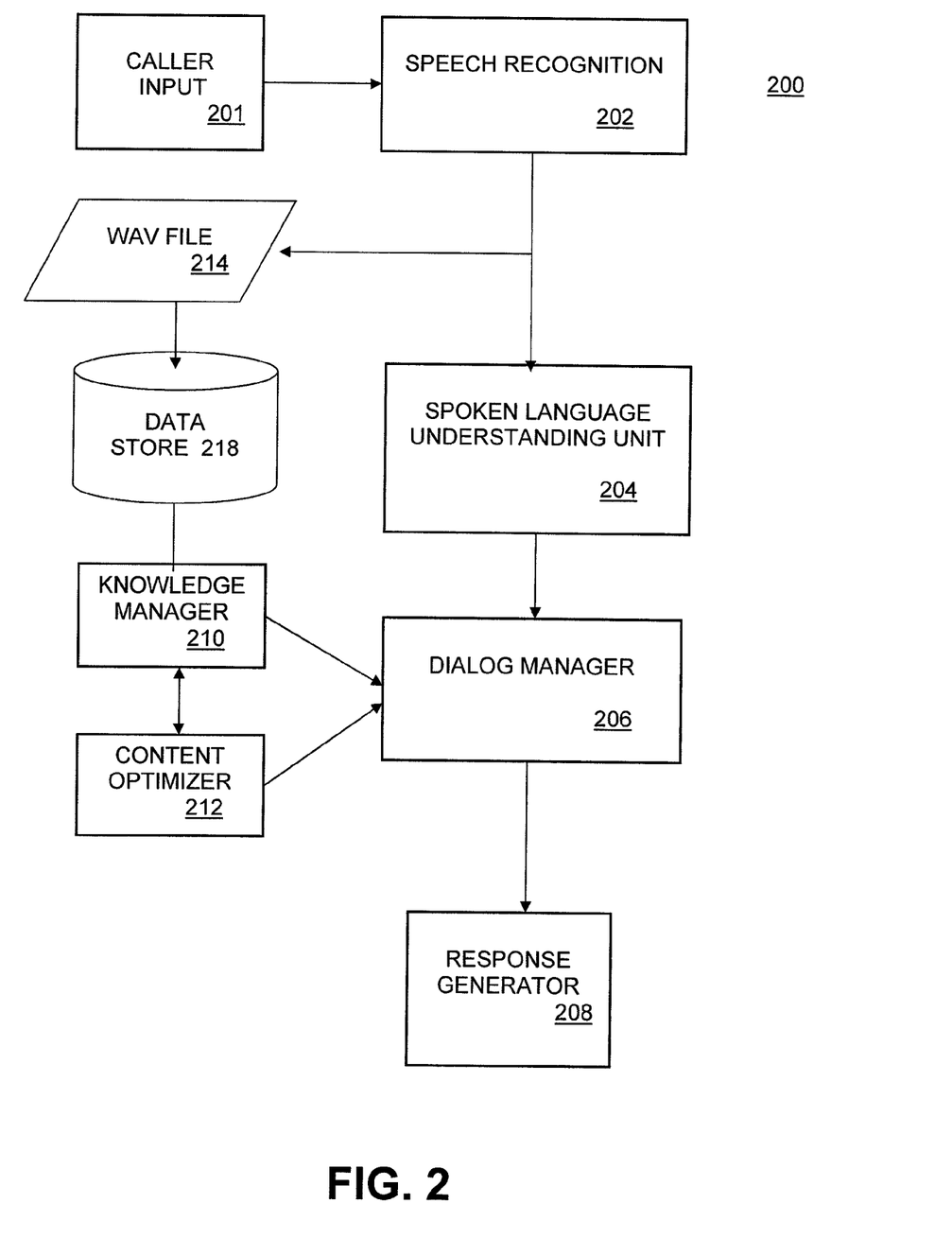
FIG. 2 is a block diagram of a dialog system that is used in conjunction with an agent console, under an embodiment.

For the overall call center system illustrated in FIG. 1, the agent console 104 interfaces between the caller and a dialog system 102. In one embodiment, the dialog system 102 is based on a speech recognition and dialog manager system to process spoken dialog received from one or more callers 110. FIG. 2 is a block diagram of a dialog system that is used in conjunction with an agent console, under an embodiment. As shown in FIG. 2, the core components of system 200 include a spoken language understanding (SLU) module 204 with multiple understanding strategies for imperfect input, an information-state-update or other kind of dialog manager (DM) 206 that handles multiple dialog threads and mixed initiatives, a knowledge manager (KM) 210 that controls access to ontology-based domain knowledge, and a content optimizer 212 that connects the dialog manager and the knowledge manager for resolving ambiguities from the users' requests, regulating the amount of information to be presented to the user, as well as providing recommendations to users. In one embodiment, the caller's spoken input 201 produces acoustic waves that are received by a speech recognition unit 202. The speech recognition unit 202 can include components to provide functions, such as dynamic grammars and class-based n-grams. In the case where the caller input 201 is text-based rather than voice-based, the speech recognition unit 202 is bypassed, and simulated user input is provided directly to the spoken language understanding unit 204.

A response generator 208 provides the output of the system 200. The response generator 208 generates audio and/or text output based on the user input. Such output can be an answer to a query, a request for clarification or further information, reiteration of the user input, or any other appropriate response that is appropriate for the call center system 100. The response generator 208 utilizes domain information when generating responses. Thus, different wordings of saying the same thing to the user will often yield very different results. Datastore 218 can hold information organized into one or more databases. One database can be a static database that contains factual information, or information frequently used by the user (such as derived from a user profile or model).

For the embodiment of system 200, the caller input 201 is processed by the speech recognition component 202 to produce a digital audio file (.wav file) for each utterance. This file is stored in a database in datastore 218. During normal processing, the speech recognizer 202, SLU 204 and dialog manager 206 work to process and interpret the caller input and generate the appropriate responses. In some cases, the caller input may not be properly interpreted in the speech recognizer or SLU, and/or an appropriate response may not be available by the dialog manager. In a call center application, this misunderstanding would trigger the intervention of a live agent, either through direct command by the user, or an automatic intervention mechanism.

Figure 3:
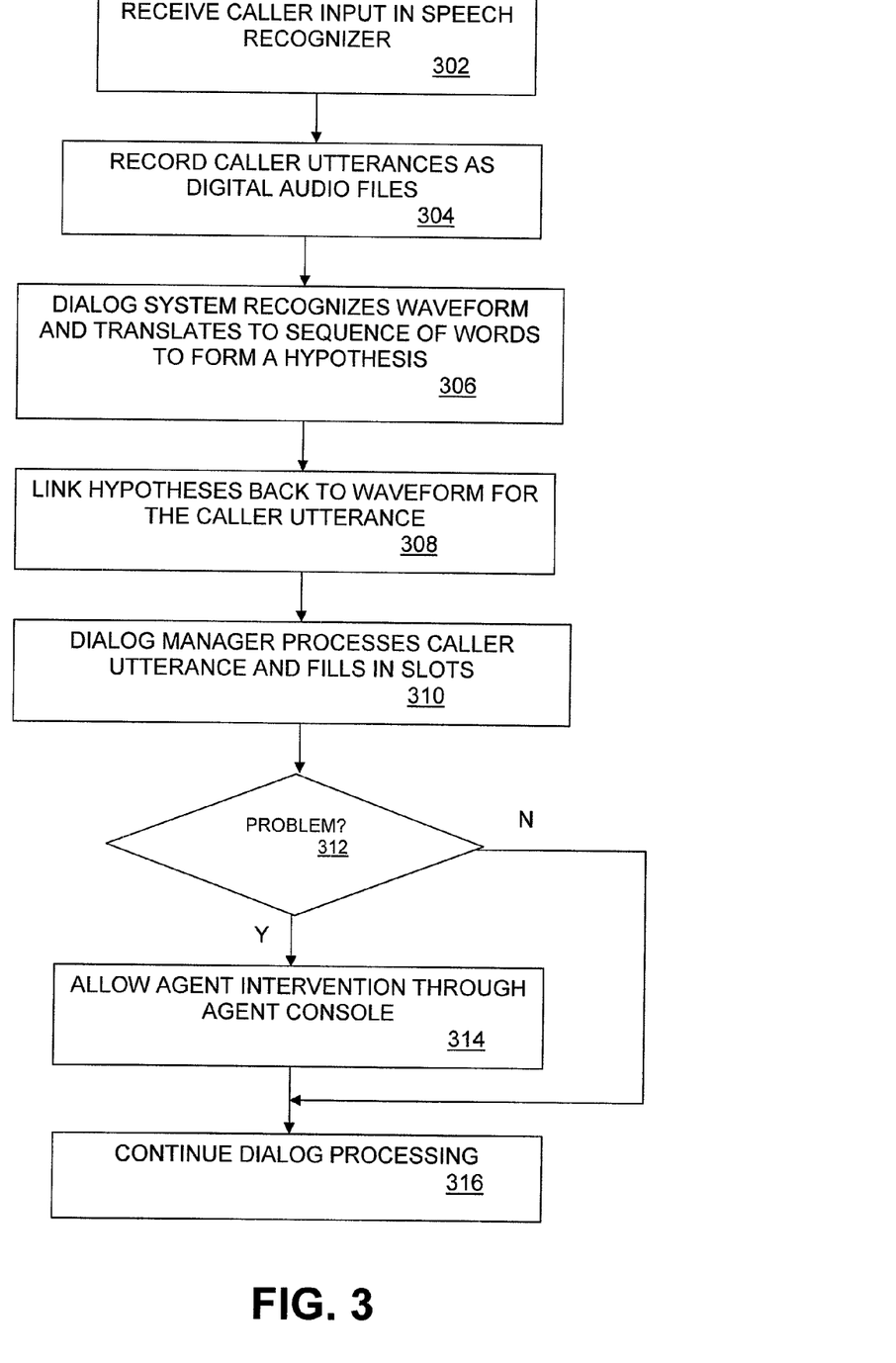
FIG. 3 is a flowchart illustrating a method of processing caller utterances in a dialog system monitored by an agent console, under an embodiment.

FIG. 3 is a flowchart illustrating a method of processing caller utterances in a dialog system monitored by an agent console, under an embodiment. In block 302, the speech recognizer unit receives the caller input. The caller utterances in the caller input are stored as digital audio files, such as .wav files, block 304. The dialog system then performs a recognition process that translates the waveform into a sequence of words, block 306. The sequence of words comprises a hypothesis for the dialog system. The hypothesis may be represented as or associated with a confidence level that indicates a degree or percentage of accuracy of the recognized utterance. As shown in block 308 of FIG. 3, the hypothesis is then linked back to the waveform. The dialog manager processes the user utterance and fills in the slots, block 310.

In certain cases, the processed utterances may be incorrect due to misrecognition. Typically in this case, the confidence level of a hypothesis is relatively low. The system response based on such a hypothesis may then cause a problem for the caller. In block 312, the system determines whether or not there is a problem with the processed caller utterance and/or the system response. If there is no problem, the system proceeds with the normal sequence of dialog processing, block 316. If there is a problem, however, the system allows live agent intervention with the caller, block 314. Upon resolution of the problem, the call is either terminated, or the system may proceed with normal dialog processing, block 316

As shown in the flowchart to FIG. 3, the live agent is allowed to intervene upon the occurrence of a problem between the caller and the dialog system. The live agent intervention may be invoked by the caller himself or herself upon the utterance of an appropriate spoken command or keying in defined command sequence. Alternatively, the system may be configured to automatically notify the agent upon the occurrence of a situation that is recognized by the system as a problem or potential problem. For example, incidences such as the caller repeating the same phrase twice, raising their voices, lengthy pauses, or similar events may trigger the agent intervention.

The call monitor process 108 monitors the call between the caller 110 and the dialog system 102. To help the agent 112 locate potential problems quickly, the information provided by the agent console 104 is categorized as different levels based on the confidence which is produced by the modules in the automated dialog system 200. These modules can be any of the speech recognition 202, spoken language understanding 204, or other modules. In the case that the agent is monitoring several interactions, the agent console 104 can also send out a warning message when some information is so unconfident that it suggests there are some errors in the interaction and the agent may need to intervene.

Figure 4:
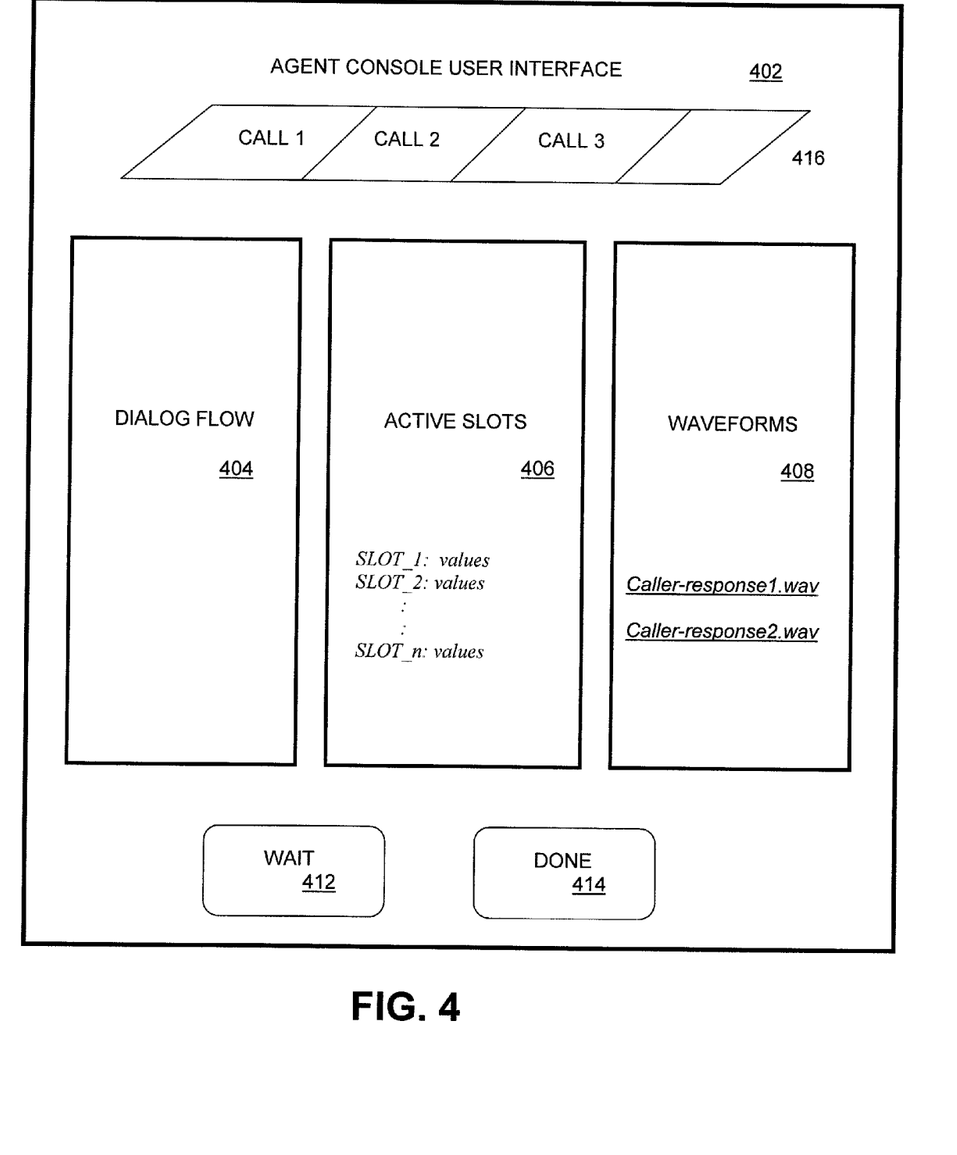
FIG. 4 illustrates a layout of a graphical user interface for an agent console, under an embodiment.

The agent console 104 includes a user interface 106 that provides a display to the agent of the one or more calls that the agent is monitoring. In one embodiment, the user interface displays pertinent information relating to the dialog flow, active slots, and waveforms for each of the conversations that are being monitored. FIG. 4 illustrates a layout of a graphical user interface for an agent console, under an embodiment. As shown in user interface window 402, three separate sub-windows provide information regarding the monitored conversation. The first sub-window 404 displays the current state of the dialog as provided by the dialog system. In general, the dialog flow is defined by the system designer using dialog templates or similar structures. The dialog system goes through the dialog using the defined template. It matches the conversational situation with the defined structure and determines which state exists for the next step. The second sub-window 406 displays the active slots associated with the current state, along with the values for each of the slots. The slot values represent the values filled in by the dialog manager during the processing of the caller utterances, as shown in block 310 of FIG. 3. The third sub-window 408 provides access to the actual waveforms of the caller utterances. In one embodiment, these are provided by HTML links to the .wav files that comprise the waveforms, as stored by the speech recognizer and referenced in block 308 of FIG. 3. These waveform links provide a mechanism for the agent to directly access the raw audio data comprising the caller's spoken input to the dialog system.

The agent console is configured to allow the agent to monitor several calls at one time, up to a number that number that is practically limited by the capacity of the system. The different calls can be indicated in the graphical user interface in any number of ways, such as through tabs 416. Clicking on a tab corresponding to a conversation will cause the display of the subwindows 404-408 for that conversation.

For the embodiment of FIG. 4, the user interface also provides command buttons to allow the agent to dictate the flow of the conversation once the agent has intervened. For example, a "wait" command button 412 allows the agent to generate a "please wait" command that requests the caller to wait for input by the agent; and a "done" command button 414 allows the agent to transfer control of the conversation back to the dialog system upon completion of the agent intervention. The agent console 104 can also provide access to editing functions so that the agent may conveniently change the content the automated interaction system generates, (i.e., the semantic information, etc.), feed the corrected information to the automated system, and let the automated system move on with the right information.

It should be noted that the user interface of FIG. 4 is one example of a possible user interface and that many different layouts and display components can be included according to embodiments of the agent console system.

The user interface and agent console of system 100 allows the agent with mechanisms to effectively access and intervene in the interaction between the automated system and the caller. The present state of the dialog flow is presented to the agent, along with specific values of the slots as understood by the dialog manager component, and the actual waveforms comprising the caller input. In this manner, comprehensive information about the dialog is presented in a hierarchical manner from general to very specific information about the dialog. This information is cross-linked through the user interface so that the agent can quickly access relevant information with the desired degree of granularity.

The described embodiments enable a live agent to access and intervene in the interaction between an automated interaction system and a caller whenever necessary. The agent console presents utilizes the conversation flow, the obtained semantic information, and the recognized utterances and associated waveforms, which are cross-linked and attached with a confidence level so that the agent can easily find the correspondence and navigate among them, and address the problems in the interaction accordingly. Embodiments of the agent console system can be used in mixed-initiative systems in which either the caller or the system takes the initiative to lead the conversation. The system can be configured to work with relatively complex tasks and sophisticated dialog flows.

Embodiments are directed to an apparatus, system or method allowing agent intervention in an automated call center application comprising an automated dialog system receiving spoken input from the caller in a dialog between the caller, translating the spoken input into a series of words to form a hypothesis regarding the caller input; a call monitoring module monitoring the dialog between a caller and an automated dialog system, and allowing the agent to intervene in the event that the hypothesis formed by the automated dialog system does not exceed a defined threshold confidence level; and a user interface providing the agent with information regarding the conversation flow between the caller and the automated dialog system, obtained semantic information for the dialog, and waveform information for the recognized utterances within the dialog. The dialog may comprise part of a telephone conversation between the caller and the automated dialog system, and the agent may compelled to intervene upon a request by the caller, or upon the occurrence of a defined event detected by the call monitoring module, which may be one or more of the following: a repetition of input by the caller, a pause by the caller exceeding a defined time limit, an increase in spoken volume by the caller. The conversation flow comprises state information for a current state and past states of the dialog between the caller and the automated dialog system.

In the above embodiment, the obtained semantic information may comprise one or more active slots associated with the current state of the dialog with respective values for each slot of the one or more active slots. The spoken utterance from the caller may be stored in one or more digital audio files in a datastore, and the waveform information for the recognized utterances within the dialog may comprise links to respective waveform files stored in the datastore. These waveform files may comprise waveform audio format files. In an embodiment, the hypothesis is associated with a confidence level determined by a speech recognizer component, and the conversation flow objects, obtained semantic information for the dialog, and waveform information are cross-linked in the user interface through the confidence level.

Although embodiments have been described with respect to application in call center applications, it should be noted that such embodiments may also be applied to many other applications, such as in-car devices and services (e.g., navigation systems), any other voice-operated man-machine interface.

For purposes of the present description, any of the processes executed on a processing device may also be referred to as modules or components, and may be standalone programs executed locally on a respective device computer, or they can be portions of a distributed client application run on one or more devices.

Aspects of the agent interaction system described herein may be implemented as functionality programmed into any of a variety of circuitry, including programmable logic devices ("PLDs"), such as field programmable gate arrays ("FP-GAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the described system may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the agent interaction system is not intended to be exhaustive or to limit the embodiments to the precise form or instructions disclosed. While specific embodiments of, and examples for, processes in computing devices are described herein for illustrative purposes, various equivalent modifications are possible within the scope of the disclosed methods and structures, as those skilled in the relevant art will recognize. The elements and acts of the various embodiments described above can be combined to provide further embodiments. These and other changes can be made to the response generation process in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed system and method are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. An apparatus allowing agent intervention in an automated call center application configured to handle multiple simultaneous calls, the method comprising:
   a processor-based automated dialog system receiving spoken input from the caller in a dialog between the caller, translating the spoken input into a series of words to form a hypothesis regarding the caller input;
   a notification module configured to automatically notify the agent upon recognition of a potential problem indicated by one of: a repeat by the caller of a phrase, a pause of a duration exceeding a defined time limit, and an increase in volume by the caller over a defined threshold volume;
   a call monitoring module monitoring the dialog between a caller and an automated dialog system, and allowing the agent to intervene in the event that a confidence level in the hypothesis formed by the automated dialog system does not exceed a defined threshold confidence level;
   a graphical user interface component displaying dialog information for a plurality of conversations comprising the multiple simultaneous calls through respective tabbed subwindows;
   a user interface providing the agent with information for each conversation of the plurality of conversations, regarding the conversation flow between the caller and the automated dialog system, obtained semantic information for the dialog, and waveform information for the recognized utterances within the dialog of a respective conversation, and wherein the notification module provides an automatic notification for any of the plurality of conversations as a potential problem occurs between the automated dialog system and a respective caller, and wherein each tabbed subwindow includes respective display areas displaying information for the conversation flow in a first display window showing dialog flow, obtained semantic information in a second display window showing a plurality of active slots associated with a current state of the respective conversation and respective slot values for each of the plurality of active slots, and waveform information in a third display window showing actual waveforms of caller utterances provided by waveform files, for a respective call.

2. The apparatus of claim 1 wherein the dialog comprises part of a telephone conversation between the caller and the automated dialog system.

3. The apparatus of claim 2 wherein the agent is compelled to intervene upon a request by the caller.

4. The apparatus of claim 2 wherein the agent is compelled to intervene upon the occurrence of a defined event detected by the call monitoring module, the defined event comprising the potential problem.

5. The apparatus of claim 4 further comprising an editing function module configured to allow the agent to provide corrected information to the automated dialog system.

6. The apparatus of claim 1 wherein the conversation flow comprises state information for a current state and past states of the dialog between the caller and the automated dialog system.

7. The apparatus of claim 6 wherein the obtained semantic information comprises one or more active slots associated with the current state of the dialog with respective values for each slot of the one or more active slots.

8. The apparatus of claim 7 wherein the spoken utterance from the caller is stored in one or more digital audio files in a datastore, and wherein the waveform information for the recognized utterances within the dialog comprises links to respective waveform files stored in the datastore.

9. The apparatus of claim 8 wherein the waveform files comprise waveform audio format files.

10. The apparatus of claim 1 wherein the hypothesis is associated with a confidence level determined by a speech recognizer component, and wherein the conversation flow objects, obtained semantic information for the dialog, and waveform information are cross-linked in the user interface through the confidence level.

11. A non-transitory computer-readable medium encoded with computer program code that includes processing steps for generating a user interface for use in a dialog system, wherein the processing steps cause a processor-based computer to execute steps comprising:
   processing caller utterances for multiple simultaneous calls between callers and an automated response generator in a dialog system, the processing including translating caller utterances into a series of words and forming a hypothesis as to which words were spoken by the caller;
   providing a user interface for an agent monitoring a dialog between the callers and the automated response generator;
   displaying, in a first display window of the user interface, state information associated with a dialog between a first caller and an automated response generator in the dialog system;
   displaying, in a second display window of the user interface, one or more active slots associated with the current state of the dialog with the first caller with respective values for each slot of the one or more active slots; and
   displaying, in a third display window of the user interface, waveform information for recognized first caller utterances in the dialog, the waveform information showing actual waveforms of caller utterances;
   displaying dialog information for other calls of the multiple simultaneous calls in tabbed subwindows, wherein each subwindow contains a respective first display window, second display window and third display window;

automatically notifying the agent upon recognition of a potential problem indicated by one of: a repeat by a caller of a phrase, a pause of a duration exceeding a defined time limit, and an increase in volume by the caller over a defined threshold volume; and allowing intervention by a live agent in a telephone call between the caller and the automated response generator of the dialog system in the event of the potential problem when a confidence level in the hypothesis formed does not exceed a defined threshold confidence level.

12. The computer-readable medium of claim 11 wherein the first, second, and third display windows are associated with an agent console configured to allow intervention of the live agent.

13. The computer-readable medium of claim 12 wherein the agent is compelled to intervene upon the occurrence of either a caller request or automatic detection of a defined event corresponding to the potential problem.

14. The computer-readable medium of claim 13 further comprising program code for:

generating a first command button allowing the agent to request that the caller wait for clarification of a misunderstanding by the system; and generating a second command button allowing the agent to pass control of the dialog back to the automated response generator upon clarification by the agent.

15. The computer-readable medium of claim 14 wherein the caller utterances are stored in one or more digital audio files in a datastore, and wherein the waveform information for the recognized utterances within the dialog comprises links to respective waveform files stored in the datastore.

16. A method comprising:

processing caller utterances for multiple simultaneous calls between callers and an automated response generator in a dialog system, the processing including translating caller utterances into a series of words and forming a hypothesis as to which words were spoken by the caller;

providing a user interface for an agent monitoring a dialog between the callers and the automated response generator;

displaying, in a first display window of the user interface, state information associated with a dialog between a first caller and an automated response generator in the dialog system;

displaying, in a second display window of the user interface, one or more active slots associated with the current state of the dialog with the first caller with respective values for each slot of the one or more active slots; and displaying, in a third display window of the user interface, waveform information for recognized caller utterances in the dialog, the waveform information showing actual waveforms of caller utterances;

displaying dialog information for other calls of the multiple simultaneous calls in tabbed subwindows, wherein each subwindow contains a respective first display window, second display window and third display window;

automatically notifying the agent upon recognition of a potential problem indicated by one of: a repeat by a caller of a phrase, a pause of a duration exceeding a defined time limit, and an increase in volume by the caller over a defined threshold volume; and allowing intervention by the agent in a telephone call between the caller and the automated response generator of the dialog system in the event of the potential problem when a confidence level in the hypothesis formed does not exceed a defined threshold confidence level.

17. The method of claim 16 further comprising allowing the agent, through an editing function, to provide corrected information to the automated dialog system, in the event of the misunderstanding of the caller utterance.

18. The method of claim 17 further comprising:

allowing the agent to request that the caller wait for clarification of the misunderstanding by the system; and allowing the agent to pass control of the dialog back to the automated response generator upon clarification by the agent.

19. The method of claim 16 further comprising storing the caller utterances in one or more digital audio files in a datastore, and providing links to the respective waveform files stored in the datastore in the third display window.

20. The method of claim 16 further comprising:

associating the processed caller utterances with a confidence level determined by a speech recognizer component in the dialog system; and cross-linking the conversation flow objects, obtained semantic information for the dialog, and waveform information in the user interface through the confidence level.

* * * * *